United States Patent
Sugisawa et al.

(10) Patent No.: US 8,126,008 B2
(45) Date of Patent: Feb. 28, 2012

(54) COMMUNICATION SYSTEM AND COMMUNICATION APPARATUS

(75) Inventors: Koutarou Sugisawa, Chiyoda-ku (JP); Satoshi Mizogami, Chiyoda-ku (JP); Takahiro Kamada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 178 days.

(21) Appl. No.: 11/997,702

(22) PCT Filed: Nov. 30, 2006

(86) PCT No.: PCT/JP2006/323916
§ 371 (c)(1),
(2), (4) Date: Feb. 1, 2008

(87) PCT Pub. No.: WO2008/068795
PCT Pub. Date: Jun. 12, 2008

(65) Prior Publication Data
US 2010/0226393 A1    Sep. 9, 2010

(51) Int. Cl.
*H04L 12/43* (2006.01)
(52) U.S. Cl. .................... 370/458; 709/209

(58) Field of Classification Search .............. 370/389, 370/360, 400, 376, 386, 396, 401, 402, 428, 370/314, 321, 458, 442; 709/208, 209, 203, 709/211
See application file for complete search history.

(56) References Cited

U.S. PATENT DOCUMENTS
6,889,211 B1 * 5/2005 Yoshiura et al. ............... 705/58
(Continued)

FOREIGN PATENT DOCUMENTS
DE       103 53 337 A1    6/2005
(Continued)

OTHER PUBLICATIONS

German Office Action dated Aug. 4, 2009 in corresponding German Patent Application No. 11 2006 004 094.4-55.
(Continued)

*Primary Examiner* — Brenda H Pham
(74) *Attorney, Agent, or Firm* — Sughrue Mion, PLLC

(57) ABSTRACT

Data communication sub-slots of a cycle in a time division mode are allocated to communication apparatuses; a maintenance communication sub-slot is allocated to the communication apparatus operating as a master communication apparatus; the communication apparatuses perform data communication with the use of the data communication sub-slots allocated thereto; and the communication apparatus uses the maintenance communication sub-slot to change or monitor information about the communication of the communication apparatuses in the time division mode.

10 Claims, 12 Drawing Sheets

U.S. PATENT DOCUMENTS

| | | | |
|---|---|---|---|
| 6,983,154 B2 * | 1/2006 | Niwa | 455/456.1 |
| 7,043,727 B2 * | 5/2006 | Bennett et al. | 718/100 |
| 7,113,927 B1 * | 9/2006 | Tanaka et al. | 705/56 |

FOREIGN PATENT DOCUMENTS

| | | |
|---|---|---|
| JP | 11-261581 A | 9/1999 |
| JP | 2001339461 A | 12/2001 |
| JP | 2003-234715 A | 8/2003 |
| JP | 3566304 B2 | 6/2004 |
| JP | 37909376 B2 | 8/2005 |
| JP | 2005-293569 A | 10/2005 |
| JP | 2006-318367 A | 11/2006 |
| WO | 03/063434 A2 | 7/2003 |
| WO | 2004/010652 A1 | 1/2004 |

OTHER PUBLICATIONS

Decision of a Patent Grant corresponding to Patent Application No. 2007-524122 dated Aug. 16, 2011.

* cited by examiner

COMMUNICATION SYSTEM AND COMMUNICATION APPARATUS

TECHNICAL FIELD

The present invention relates to communication in FA (Factory Automation), and more particularly, to maintenance communication in FA (Factory Automation) using time-division communication mode.

BACKGROUND ART

A plurality of CPU units (communication apparatuses) such as sequencers and servo controllers is generally provided in communication in an FA system, and these communication apparatuses are connected through a bus to use a time division mode, which allocates a slot acquired by dividing a predetermined cycle to each communication apparatus. Technologies related to a conventional communication system using the time division mode include patent document 1, patent document 2, and non-patent document 1. Patent document 1 discloses a technology of dividing a temporal resource of a serial bus by a plurality of communication apparatuses. Patent document 2 discloses a technology of executing transmission from a plurality of communication apparatuses in each cycle. Non-patent document 1 discloses a technology related to an isochronous packet transfer mode used for a standard time division mode in the FA area.

Patent Document 1: Japanese Patent No. 3566304
Patent Document 2: Japanese Patent Application Laid-Open No. 2005-293569
Non-Patent Document 1: IEEE 1394

DISCLOSURE OF INVENTION

Problem to be Solved by the Invention

However, since a slot allocated to the own apparatus is used for data communication in conventional technologies described in above patent document 1, patent document 2, and non-patent document 1, setting for communication (various setting values of the time division mode related to communication such as timings of transmission/reception and synchronization setting in communication apparatuses) cannot be changed during the data communication. That is, if the setting for communication is changed in the conventional technologies described in above patent document 1, patent document 2, and non-patent document 1, the data communication must be started again after the data communication is temporarily terminated to change the setting for communication, and it is problematic that the throughput of the data communication is reduced.

The present invention was conceived in view of the above situations and it is therefore the object of the present invention to provide a communication system that can update or monitor various setting values related to communication in a time division mode without discontinuing data communication when using the time division mode to perform the data communication.

Means for Solving Problem

According to an aspect of the invention, there is provided a communication system comprising communication apparatuses that communicates with each other in a time division mode, the communication apparatuses being assigned respective sub-slots into which a predetermined cycle is divided, and each communication apparatus transmitting data in a sub-slot allocated thereto. The cycle includes a plurality of data communication sub-slots allocated to the communication apparatuses for data communication, and a maintenance communication sub-slot used for maintenance communication of the communication apparatuses. Each of the communication apparatuses comprises a communication setting register having set thereon various setting values related to the cycle in the time division mode, the data communication sub-slot, and the maintenance sub-slot; and a communication controlling unit that controls communication in the time division mode based on various communication setting values in the communication setting register to transmit a data frame including data to be transmitted in the data communication sub-slot allocated to the own apparatus, the communication controlling unit using data included in a data frame received in the data communication sub-slot allocated to another communication apparatus to control the own apparatus. One of the communication apparatuses operates as a master communication apparatus. The master communication apparatus further comprising a configuration register having registered thereon information about setting/monitoring related to the maintenance communication; in each data communication sub-slots, communicating data with other communication apparatus through data frames; and in the maintenance communication sub-slot assigned to the master communication apparatus, using maintenance frames to change or monitor the various setting values set in the communication setting registers of other communication apparatuses on the basis of information registered in the configuration register. Communication apparatuses other than the master communication apparatus operate as slave communication apparatus. Each slave communication apparatus, in each data communication sub-slots, communicates data with other communication apparatus through data frames; and, in the maintenance communication sub-slot assigned to the slave communication apparatus, transmits setting and set contents of the communication register based on a maintenance frame addressed to the slave communication apparatus to the master communication apparatus which is the sender of the maintenance frame. Within each cycle of the time division mode, each communication apparatus performs a data communication which deals a raised amount of data and requires a raised communication rate and a maintenance communication for monitoring and altering the various setting values concerning the cycle, the data communication sub-slots and the maintenance communication sub-slot.

According to another aspect of the invention, there is provided a communication apparatus for use in the above-outlined communication system.

Effect of the Invention

A communication system according to the present invention uses a cycle in a time division mode as a plurality of data communication sub-slots allocated to communication apparatuses for data communication and a maintenance communication sub-slot used for maintenance communication of each communication apparatus; a communication apparatus operating as a master communication apparatus uses the maintenance communication sub-slot to change or monitor a communication setting register having set thereon various setting values related to a cycle in a time division mode, the data communication sub-slot, and the maintenance sub-slot of a communication apparatus operating as a slave communication apparatus, based on a configuration register having registered thereon information about setting/monitoring for the maintenance communication; and therefore, a communication system can be acquired that can update or monitor various setting values related to communication in the time division mode without discontinuing the data communication.

EXPLANATIONS OF LETTERS OR NUMERALS

Figure 1:
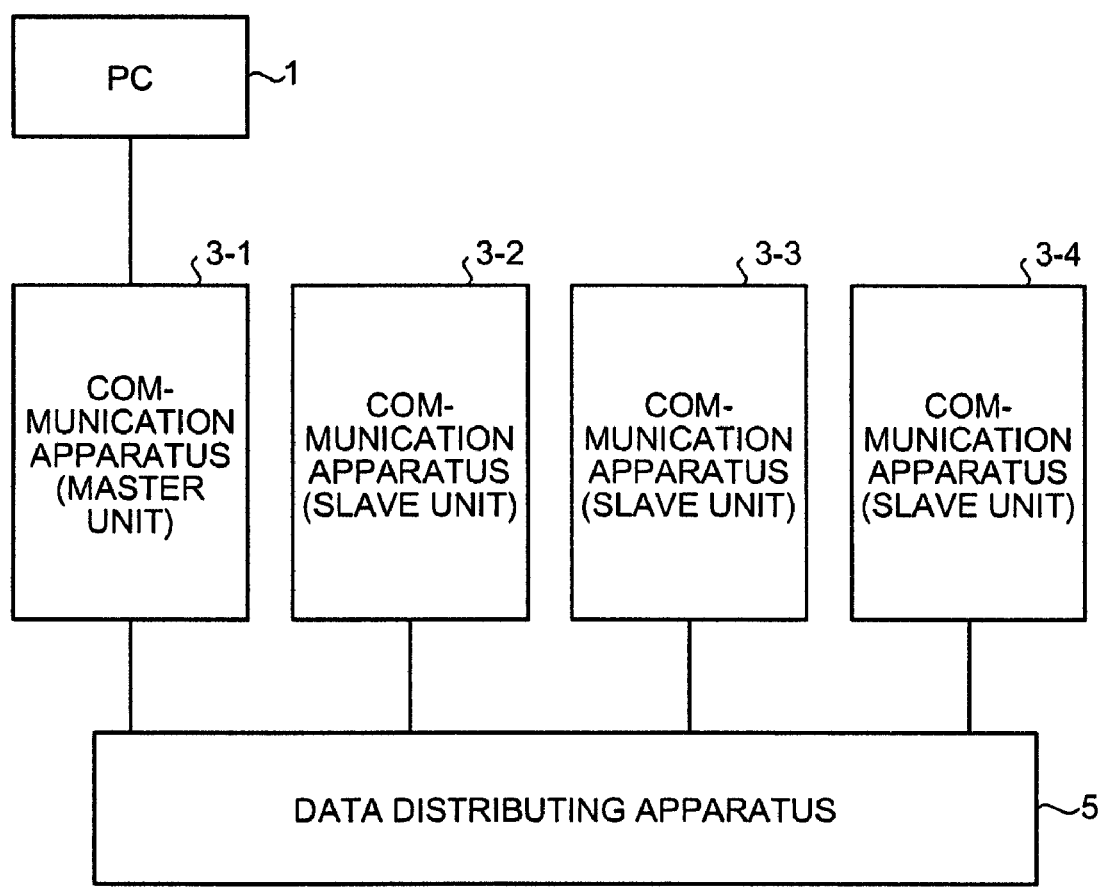
FIG. 1 is a diagram of a configuration of a first embodiment of a communication system according to the present invention.

1 PC
3-1, 3-2, 3-3, 3-4 communication apparatus
5 data distributing apparatus
31 CPU
32a, 32b communicating memory
33 configuration register
34 data transmitting unit
35 data receiving unit
36 communication setting register
37 CPU internal communication register
331 maintenance communication mode register
332 target unit information register
333 data setting register

BEST MODE(S) FOR CARRYING OUT THE INVENTION

Embodiments of a communication system and a communication apparatus according to the present invention will hereinafter be described with reference to the drawings. The present invention is not limited by the embodiments.

First Embodiment

A first embodiment of the present invention will be described with reference to FIGS. 1 to 9. FIG. 1 is a diagram of a configuration of the first embodiment of a communication system according to the present invention. In FIG. 1, the communication system includes a personal computer (hereinafter, PC) 1, a plurality of (in this case, four) communication apparatuses 3 (representing 3-1 to 3-4), and a data distributing apparatus 5.

The PC 1 includes a function of setting various registers and memories controlling the operation of the communication apparatuses 3 and is a higher-order apparatus controlling the communication apparatuses 3. The communication apparatuses 3 are CPU units such as sequencers and servo controllers in FA (Factory Automation) and exchanges data with other communication apparatuses 3 through the distributing apparatus connected by a bus. In FIG. 1, the communication apparatus 3-1 is a master communication apparatus (master unit) that performs control of communication setting, such as timings of transmission/reception and synchronization setting, for the communication apparatuses 3-2 to 3-4, and the communication apparatuses 3-2 to 3-4 having the communication setting controlled by the communication apparatus 3-1 are slave communication apparatuses (slave units). The data distributing apparatus 5 transfers a frame transmitted from the communication apparatuses 3 without generating and transmitting a frame by itself.

Figure 2:
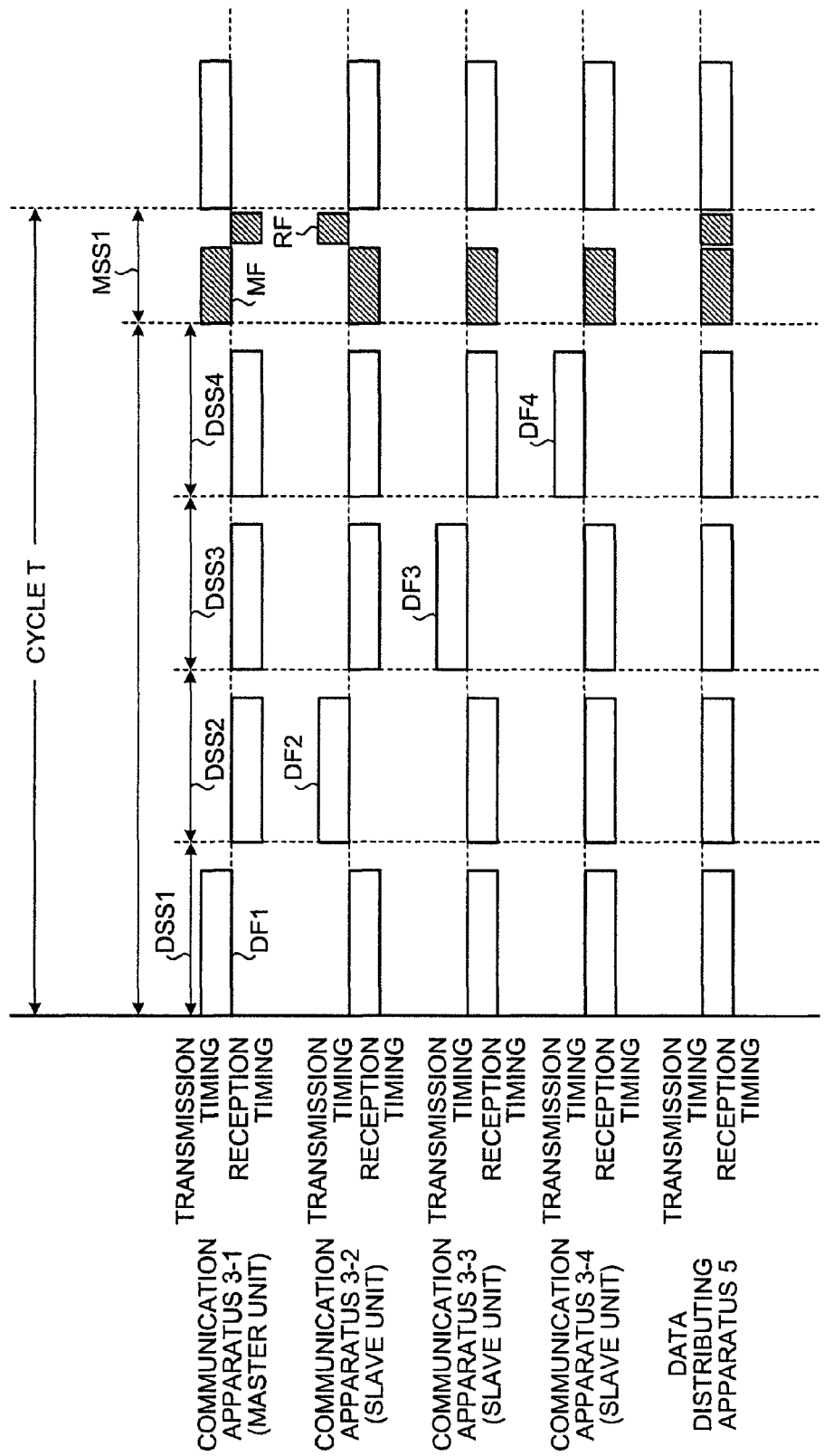
FIG. 2 is a diagram for explaining communication timings of a communication system of a first embodiment.

The communication system of the present invention allocates slots acquired by dividing a predetermined cycle to the communication apparatuses 3, and the communication apparatuses 3 performs communication with the use of a time division mode transmitting frames in the allocated slots. FIG. 2 is a diagram of communication timings of the communication system of the first embodiment. In FIG. 2, a cycle T is configured by data communication sub-slots DSS (representing DSS1 to DSS4) corresponding to the number of the communication apparatuses 3 (in this case, four) in the system, which is used for the data communication, and a maintenance communication sub-slot MSS1 corresponding to the number of the master communication apparatus (master unit) (in this case, one). In FIG. 2, the data communication sub-slot DSS1 and the maintenance communication sub-slot MSS1 are allocated to the communication apparatus 3-1; the data communication sub-slot DSS2 is allocated to the communication apparatus 3-2; the data communication sub-slot DSS3 is allocated to the communication apparatus 3-3; and the data communication sub-slot DSS4 is allocated to the communication apparatus 3-4. Although FIG. 2 shows the order of the data communication sub-slots DSS1, DSS2, DSS3, DSS4, and the maintenance communication sub-slot MSS1, this is not a limitation to the order of the data communication sub-slots DSS1, DSS2, DSS3, DSS4, and the maintenance communication sub-slot MSS1 in the cycle T, and for example, the maintenance communication sub-slot MSS1 may be located between the data communication sub-slot DSS1 and the data communication sub-slot DSS2, or may be located at the beginning of the cycle.

The communication apparatuses 3 transmit data frames DF (representing DF1 to DF4) in their own allocated data communication sub-slots DSS and receive the data frames in the data communication sub-slots DSS allocated to other communication apparatuses 3. The communication apparatus 3-1 is the master communication apparatus and transmits a maintenance frame MF to an arbitrary slave communication apparatus (the communication apparatus 3-2 in this case) in the maintenance communication sub-slot MSS1, and the communication apparatus 3-2 is the destination of the maintenance frame MF and transmits to the communication apparatus 3-1 a maintenance response frame RF that is a response frame after receiving the maintenance frame MF.

Figure 3:
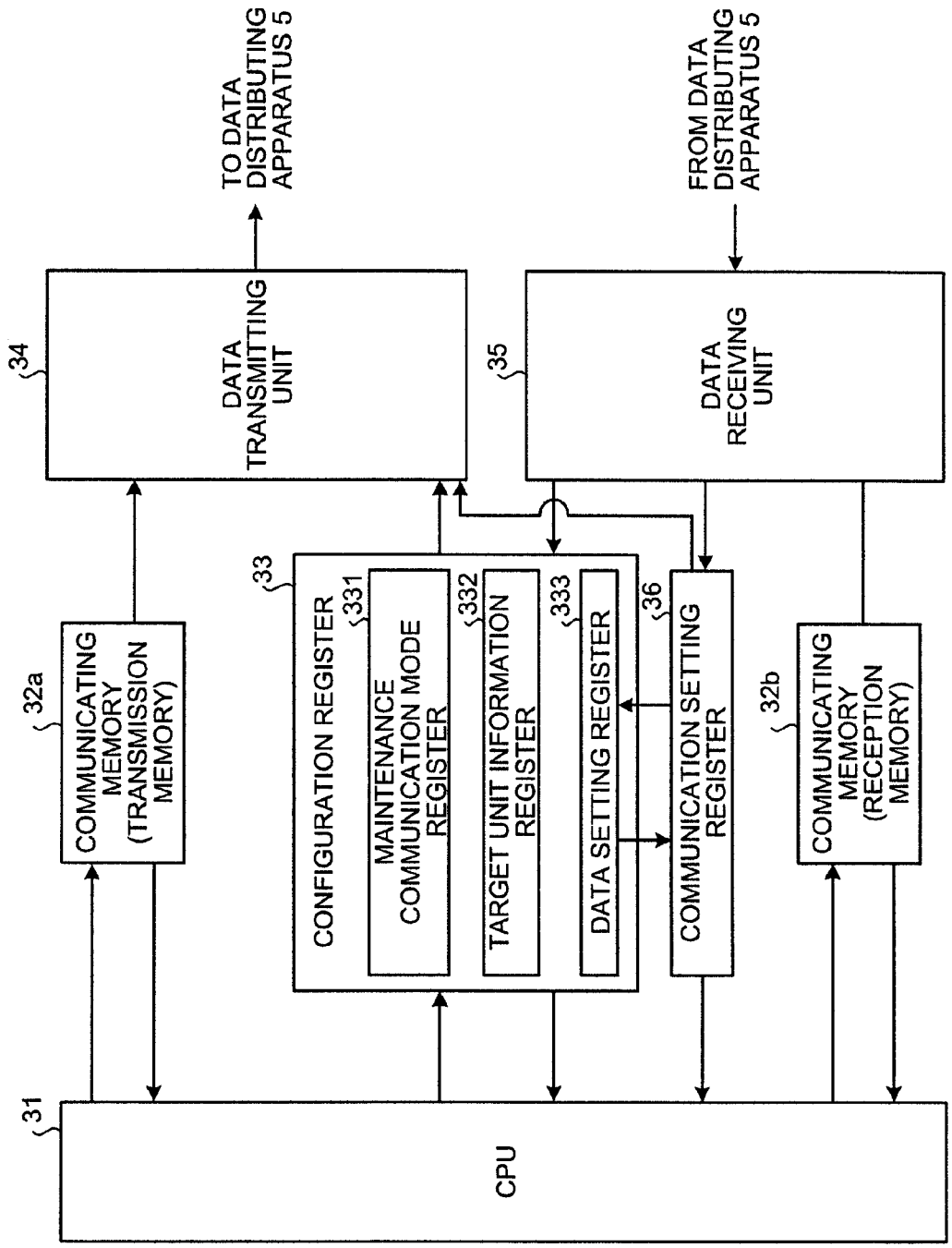
FIG. 3 is a block diagram of a configuration of a communication apparatus shown in FIG. 1.
Figure 4:
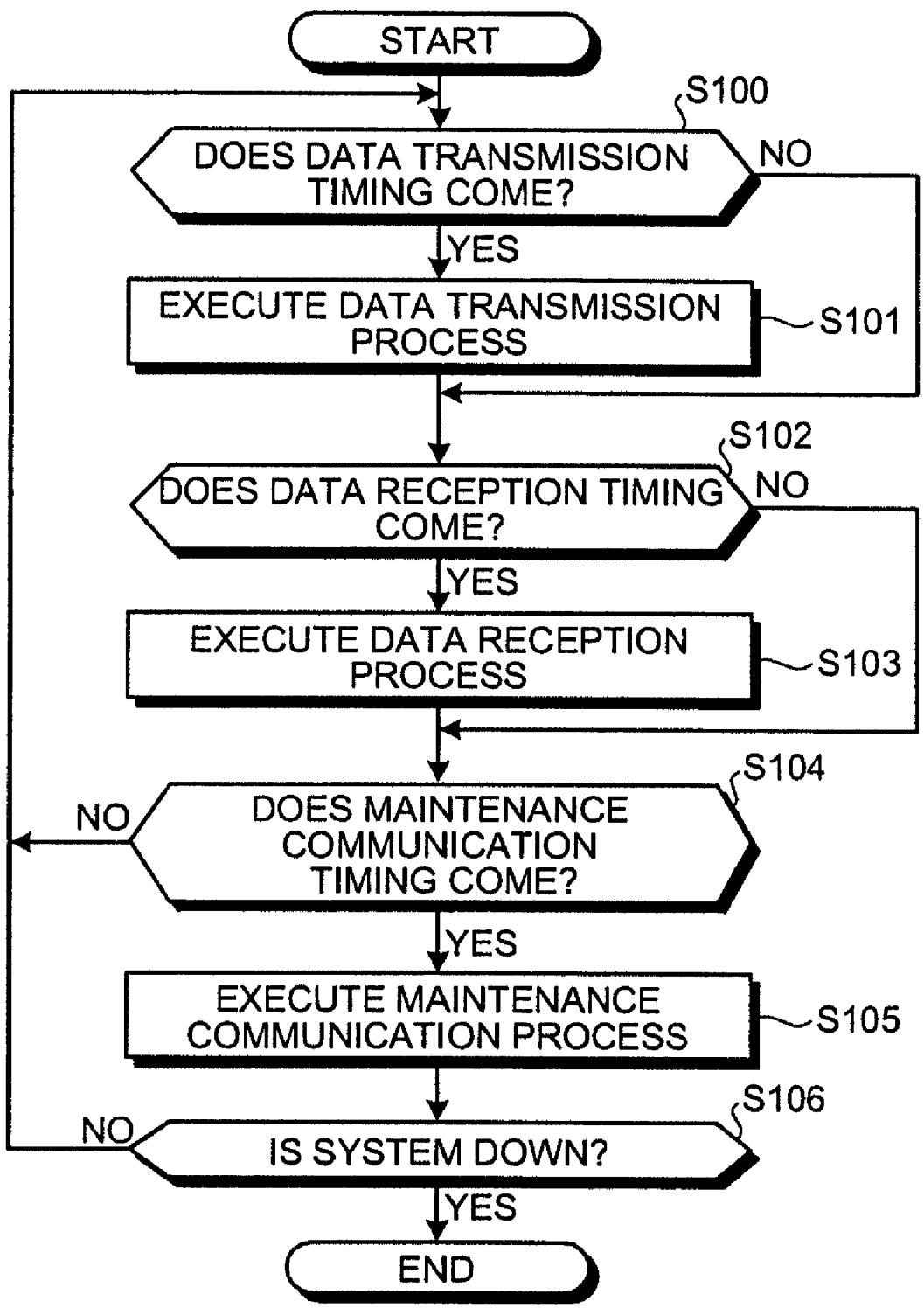
FIG. 4 is a flowchart for explaining an operation of the communication apparatus shown in FIG. 1.

FIG. 3 is a block diagram of a configuration of the communication apparatus 3 shown in FIG. 1. In FIG. 3, the communication apparatus 3 includes a CPU 31, a communicating memory 32a, a communicating memory 32b, a configuration register 33, a communication setting register 36, a data transmitting unit 34, and a data receiving unit 35.

The communication setting register 36 includes various setting values set for the communication, such as timings of transmission/reception and synchronization setting of the communication apparatus. Specifically, for example, the setting values are the cycle T of the time division mode, time of the maintenance communication sub-slot MSS1, time of the data communication sub-slots DSS, and information of the data communication sub-slot DSS allocated to the own apparatus.

The CPU 31 executes a program stored in a memory not shown to drive the communication apparatus 3 to perform a desired operation and generally controls the constituent elements of the communication apparatus 3 to perform communication in the time division mode based on the various setting values in the communication setting register 36. The CPU 31 writes data to be transmitted into the communicating memory 32a and read reception data written into the communicating memory 32b. The CPU 31 accesses to the configuration register 33 to write/read data based on the specification from the PC 1 that is the higher-order apparatus.

The communicating memory 32a is used as a transmission memory that retains transmission data to other communication apparatuses 3, which are written by the CPU 31. The communicating memory 32b is used as a reception memory that retains reception data from other communication apparatuses 3, which are written by the data receiving unit 35. Although the transmission memory retaining transmission data is the communicating memory 32a and the reception memory retaining reception data is the communicating memory 32b in FIG. 3, portions of a single physical memory may be used as the communicating memory 32a and the communicating memory 32b.

The configuration register 33 is a general name of registers having information about the maintenance communication set thereon and includes a maintenance communication mode register 331, a target unit information register 332, and a data setting register 333. In the configuration register 33, setting values are set when the CPU 31 executes the program in the initial state at the start-up of the system or at the start-up of the communication apparatus 3.

In the maintenance communication mode register 331, an operation mode of the maintenance communication is set. The operation mode includes a write mode used for changing the setting value in the communication setting register 36 of the target communication apparatus 3, a read mode used for reading (monitoring) the communication setting register 36 of the target communication apparatus 3, and a maintenance communication OFF mode used when the access (read/write) to the communication setting register 36 due to the maintenance communication is not performed. Any one of three modes is set when operating as the master communication apparatus and the maintenance communication OFF mode set when operating as the slave communication apparatus.

In the target unit information register 332, information is set which is related to the communication setting register 36 that should be accessed (updated or monitored for the setting value). Specifically, the set information is a communication apparatus identifier for identifying the accessed (target) communication apparatus 3 and area information of the communication setting register 36 that should be accessed. The area information is a beginning address and a data length of the area that should be accessed. The data setting register 333 stores various communication setting values to be updated or various communication setting values monitored.

The setting values can be set not only in the initial state but also from the PC 1 in the maintenance communication mode register 331, the target unit information register 332, and the data setting register 333 of the communication apparatus 3-1 operating as the master communicating apparatus The data transmitting unit 34 generates a data frame from the transmission data retained in the communicating memory 32a and transmits the generated data frame to the data distributing apparatus 5 at the data transmission timing of the own apparatus. If the own apparatus is the master communication apparatus, the data transmitting unit 34 generates a maintenance frame based on the setting value of the configuration register 33 and transmits the generated maintenance frame to the data distributing apparatus 5 at the maintenance communication timing. The data transmitting unit 34 generates a maintenance response frame that is a response frame to the maintenance frame addressed to the own apparatus and transmits the maintenance response frame to the data distributing apparatus 5.

The data receiving unit 35 receives the data frame from the data distributing apparatus 5, extracts data from the data frame, and causes the communicating memory 32b to retain the extracted data at the data reception timing. If the own apparatus is the slave communication apparatus, the data receiving unit 35 receives the maintenance frame from the data distributing apparatus 5 and determines whether the received maintenance frame is a maintenance frame for the own apparatus. If it is determined that the received maintenance frame is a maintenance frame addressed to the own apparatus, the data receiving unit 35 sets the communication setting register 36 based on the maintenance frame.

The operation of the first embodiment of the communication system according to the present invention will be described with reference to FIGS. 1 to 7. First, the operation of the communication apparatus 3 will be described with reference to a flowchart of FIG. 4. It is assumed that various pieces of information are set in the configuration register 33 of the communication apparatus 3. It is also assumed that a timing function not shown measures and notifies the CPU 31 of the start time of the data communication sub-slot DSS shown in FIG. 2 (the data transmission timing and data reception timing of the communication apparatus having the data communication sub-slot allocated) and the start time of the maintenance communication sub-slot MSS1 (the maintenance communication timing) based on the information about communication set in the communication setting register 36.

When the data transmission timing comes, the CPU 31 executes a data transmission process (steps S100 and S101). Specifically, when the data transmission timing comes, the CPU 31 writes into the communicating memory 32a the data to be transmitted (including a destination address of the data). The data transmitting unit 34 reads the data written into the communicating memory 32a and generates a data frame in a predetermined frame format. The data transmitting unit 34 transmits the generated data frame to the data distributing apparatus 5. The data distributing apparatus 5 transfers the transmitted data frame to the communication apparatus 3 indicated by the destination address of the data frame.

When the data reception timing comes, the CPU 31 executes a data reception process (steps S102 and S103). Specifically, at the data reception timing, the data receiving unit 35 starts waiting for reception of a frame. When receiving the data frame transferred from the data distributing apparatus 5, the data receiving unit 35 extracts data from the data frame and writes the extracted data into the communicating memory 32b. The CPU 31 reads the data written into the communicating memory 32b and uses the read data to execute a predetermined process.

When the maintenance communication timing comes, the communication apparatus executes a maintenance communication process (steps S104 and S105). Although a detailed operation of the maintenance communication process will be described later, the communication apparatus 3 repeats operations of executing the data transmission process when the data transmission timing comes, executing the data reception process when the data reception timing comes, and executing the maintenance communication process when the maintenance communication timing comes, until system down such as power-off is detected (steps S100 to S106).

The detailed operation of the maintenance communication process of the communication apparatus 3 will be described. The maintenance communication process is different in the master communication apparatus and the slave communication apparatus. First, the operation of the maintenance communication process will be described in detail for the communication apparatus 3-1, which is the master communication apparatus, with reference to a flowchart of FIG. 5. The CPU 31 determines whether the setting value of the maintenance communication mode register 331 is the write mode in the configuration register 33 (step S200). If the setting value of the maintenance communication mode register 331 is the write mode (step S200, Yes), the CPU 31 notifies the data transmitting unit 34 of generating a maintenance frame (configuration write frame) of the write mode.

The data transmitting unit 34 generates the configuration write frame based on the setting contents of the target unit information register 332 in the configuration register 33 (step S201). Specifically, the data transmitting unit 34 reads the setting values of the target unit information register 332, i.e., the communication apparatus identifier for identifying the target communication apparatus 3 and the area information of the communication setting register 36 that should be accessed (the beginning address and the accessed data length). The data transmitting unit 34 reads the setting values corresponding to the data length read from the beginning address of the data setting register 333. The data transmitting unit 34 generates the configuration write frame that includes the beginning address and the data length read from the target unit information register 332 and the setting values read from the data setting register 333 and that is addressed to the communication apparatus identifier read from the target unit information register 332. The data transmitting unit 34 transmits the generated configuration write frame to the data distributing apparatus 5 (step S202).

After the data transmitting unit 34 transmits the configuration write frame, the data receiving unit 35 waits for a configuration write response frame that is a response frame to the configuration write frame (step S203). When receiving the configuration write response frame, the data receiving unit 35 determines whether the received configuration write response frame is a configuration write response frame addressed to the own apparatus. If the received configuration write response frame is a configuration write response frame addressed to the own apparatus, the data receiving unit 35 notifies the CPU 31 of the reception of the configuration write response frame. The CPU 31 executes a predetermined process (step S204) and terminates the maintenance communication process.

On the other hand, if the write mode is not indicated by the setting value of the maintenance communication mode register 331 in the configuration register 33 (step S200, No), the CPU 31 determines whether the setting value of the maintenance communication mode register 331 is the read mode (step S205). If the setting value of the maintenance communication mode register 331 is the read mode (step S205, Yes), the CPU 31 notifies the data transmitting unit 34 of generating a maintenance frame (configuration read frame) of the read mode.

The data transmitting unit 34 generates the configuration read frame based on the setting contents of the target unit information register 332 in the configuration register 33 (step S206). Specifically, the data transmitting unit 34 reads the setting values of the target unit information register 332, i.e., the communication apparatus identifier for identifying the target communication apparatus 3 and the area information of the communication setting register 36 that should be accessed (the beginning address and the accessed data length). The data transmitting unit 34 generates the configuration read frame that includes the read area information and that is addressed to the communication apparatus identifier read from the target unit information register 332 (step S207). The data transmitting unit 34 transmits the transmitter configuration read frame to the data distributing apparatus 5 (step S208).

After the data transmitting unit 34 transmits the configuration read frame, the data receiving unit 35 waits for a configuration read response frame that is a response frame to the configuration read frame. When receiving the configuration read response frame, the data receiving unit 35 determines whether the received configuration read response frame is a configuration read response frame addressed to the own apparatus (step S209). Although described in detail later, the configuration read response frame includes some or all of the setting values requested by the configuration read frame. If it is determined that the received configuration read response frame is a configuration read response frame addressed to the own apparatus, the data receiving unit 35 extracts the setting value from the configuration read response frame, writes the extracted setting value (read data) into the data setting register 333, and notifies the CPU 31 of that effect. The CPU 31 reads the setting value written into the data setting register 333, executes a predetermined process (step S210), and terminates the maintenance communication process.

On the other hand, if the setting value of the maintenance communication mode register 331 is not the read mode in the configuration register 33 (step S206, Yes), i.e., the setting value of the maintenance communication mode register 331 indicates the maintenance communication OFF, the CPU 31 terminates the maintenance communication process without executing the maintenance communication.

Figure 6:
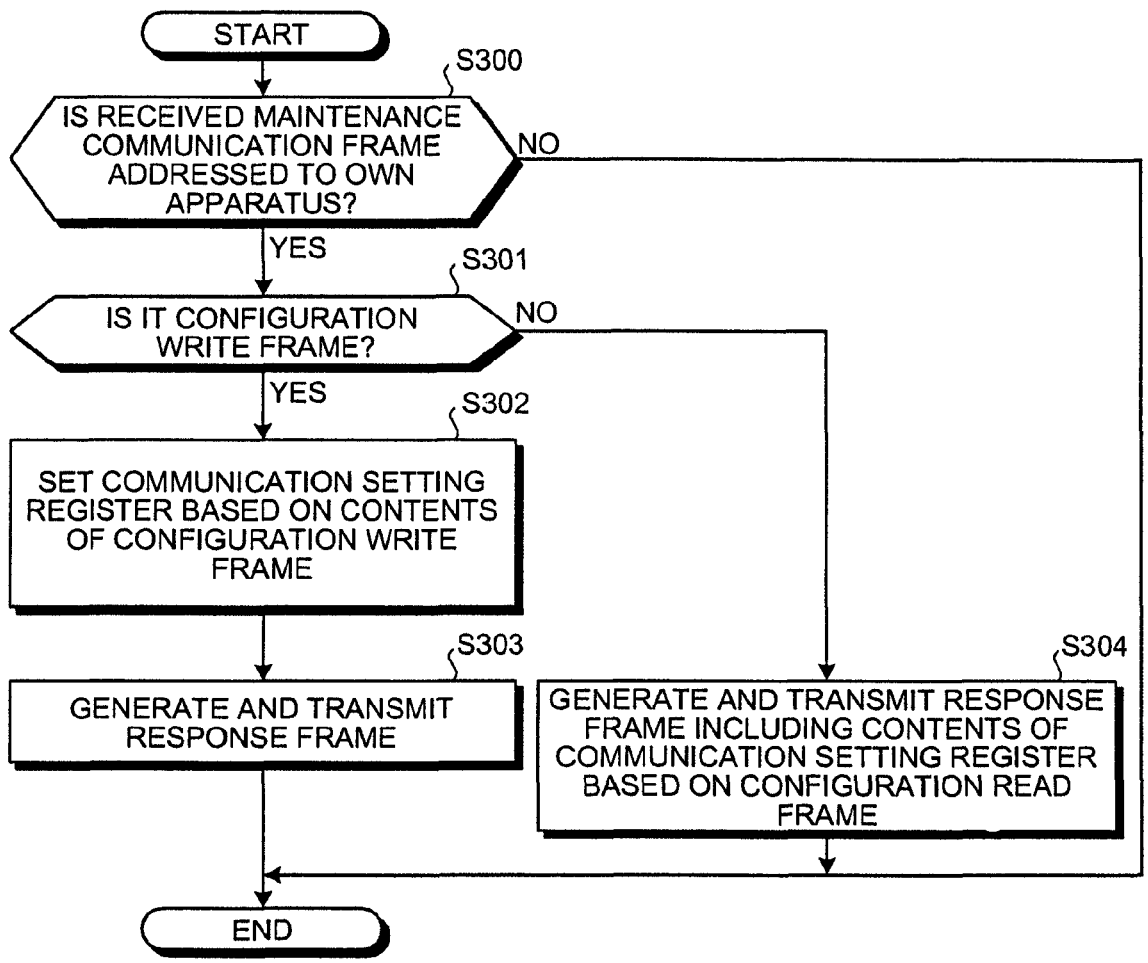
FIG. 6 is a flowchart for explaining an operation of a maintenance communication process of a communication apparatus operating as a slave.

The operation of the maintenance communication process will be described in detail for the slave communication apparatuses 3-2 to 3-4 with reference to a flowchart of FIG. 6. At the maintenance communication timing, the data receiving unit 35 starts waiting for reception of the maintenance frame (configuration write frame or configuration read frame). When the maintenance frame is received, the data receiving unit 35 determines whether the received maintenance frame is addressed to the own apparatus (step S300). If the received maintenance frame is not addressed to the own apparatus, the data receiving unit 35 discards the received maintenance frame and terminates the maintenance communication process.

If the received maintenance frame is addressed to the own apparatus, the data receiving unit 35 determines whether the maintenance frame is the configuration write frame (step S301). If the received maintenance frame is the configuration write frame, the data receiving unit 35 changes the setting value of the communication setting register 36 based on the contents of the configuration write frame (step S302). Specifically, the data receiving unit 35 extracts the beginning address, the data length, and the setting value from the configuration write frame. The data receiving unit 35 sequentially sets the setting values corresponding to the data length from the area of the communication setting register 36 indicated by the extracted beginning address.

After the data receiving unit 35 sets the data in the communication setting register 36, the data transmitting unit 34 generates the configuration write response frame addressed to the master communication apparatus 3-1 to indicate that the setting of the communication setting register 36 is performed based on the configuration write frame and transmits the configuration write response frame to the data distributing apparatus 5 (step S303) to terminate the maintenance communication process. The data distributing apparatus 5 transfers the transmitted configuration write response frame to the master communication apparatus 3-1, and the master communication apparatus 3-1 recognizes that the communication setting register 36 of the target slave communication apparatus 3-2 to 3-4 is updated by the configuration write frame.

On the other hand, if the received maintenance frame is not the configuration write frame (step S301, No), i.e., if the received maintenance frame is the configuration read frame, the data receiving unit 35 extracts the beginning address and the data length, which are the area information, from the configuration read frame and notifies the data transmitting unit 34 of the extracted beginning address and data length.

Based on the supplied beginning address and data length, the data transmitting unit 34 generates the configuration read response frame that includes the setting value of the communication setting register 36, which is the response frame to the configuration read frame, and transmits the generated configuration read response frame (step S304) to terminates the maintenance communication process. Specifically, the data transmitting unit 34 sequentially reads the setting values corresponding to the supplied data length from the area of the communication setting register 36 indicated by the supplied beginning address. The data transmitting unit 34 generates the configuration read response frame including the read setting values and addressed to the master communication apparatus 3-1 that is the transmission source of the configuration read frame. The data transmitting unit 34 transmits the generated configuration read response frame to the data distributing apparatus 5. The configuration read response frame transmitted to the data distributing apparatus 5 is transferred by the data distributing apparatus 5 to the communication apparatus 3-1, and the communication apparatus 3-1 recognizes the setting values of the communication setting register 36 of the target slave communication apparatus 3-2 to 3-4 from the setting values included in the configuration read response frame.

The operation of the communication system will be described with reference to FIG. 2. As described above, the data communication sub-slot DSS1 and the maintenance communication sub-slot MSS1 are allocated to the communication apparatus 3-1; the data communication sub-slot DSS2 is allocated to the communication apparatus 3-2; the data communication sub-slot DSS3 is allocated to the communication apparatus 3-3; and the data communication sub-slot DSS4 is allocated to the communication apparatus 3-4.

At the start time of the data communication sub-slot DSS1 (the data transmission timing of the communication apparatus 3-1), the master unit, i.e., the communication apparatus 3-1 generates and transmits a data frame DF1 to the data distributing apparatus 5 through the above data transferring process. On the other hand, in the data communication sub-slot DSS1 allocated to the communication apparatus 3-1, the slave units, i.e., the communication apparatuses 3-2 to 3-3 and the data distributing apparatus 5 are in the reception waiting state. The data distributing apparatus 5 analyzes the data frame DF1 to recognize the communication apparatus 3-2 to 3-4 that is the destination slave unit and transfers the data frame DF1 to the destination communication apparatus 3-2 to 3-4. The communication apparatus 3-2 to 3-4 receives the data frame DF1 and executes the above data reception process.

At the start time of the data communication sub-slots DSS2 to DSS4 (the data transmission timings of the communication apparatuses 3-2 to 3-4), the communication apparatuses 3-2 to 3-4 generate and transmit data frames DF2 to DF4 to the data distributing apparatus 5 through the above data transferring process as is the case with the communication apparatus 3-1. The data distributing apparatus 5 analyzes the data frames DF2 to DF4 to recognize the destination communication apparatuses 3-1 to 3-4 and transfer the data frames DF2 to DF4 to the destination communication apparatuses 3-1 to 3-4. The communication apparatuses 3-1 to 3-4 receive the data frames DF2 to DF4 and execute the above data reception process.

At the start time of the maintenance communication sub-slot MSS1 (the maintenance communication timing), the master unit, i.e., the communication apparatus 3-1 generates and transmits the maintenance frame (configuration write frame or configuration read frame) to the data distributing apparatus 5 through the above maintenance communication process of the master communication apparatus. In this case, the communication apparatus 3-1 transmits the maintenance frame addressed to the communication apparatus 3-2. The data distributing apparatus 5 analyzes the maintenance frame to recognize the communication apparatus 3-2 that is the destination slave unit and transfers the maintenance frame to the communication apparatus 3-2. The communication apparatus 3-2 receives the maintenance frame and executes the above maintenance communication process of the slave communication apparatus to generate and transmit to the data distributing apparatus 5 a maintenance response frame RF (configuration write response frame and configuration read response frame) that is a response frame to the maintenance frame. The data distributing apparatus 5 receives and analyzes the maintenance response frame RF to recognize the destination communication apparatus 3-1 and transfers the maintenance response frame RF to the communication apparatus 3-1. The communication apparatus 3-1 receives the maintenance response frame to recognize that the maintenance communication (changing in the setting value or monitoring of the communication value related to the communication of the target communication apparatus) is completed.

Figure 7:
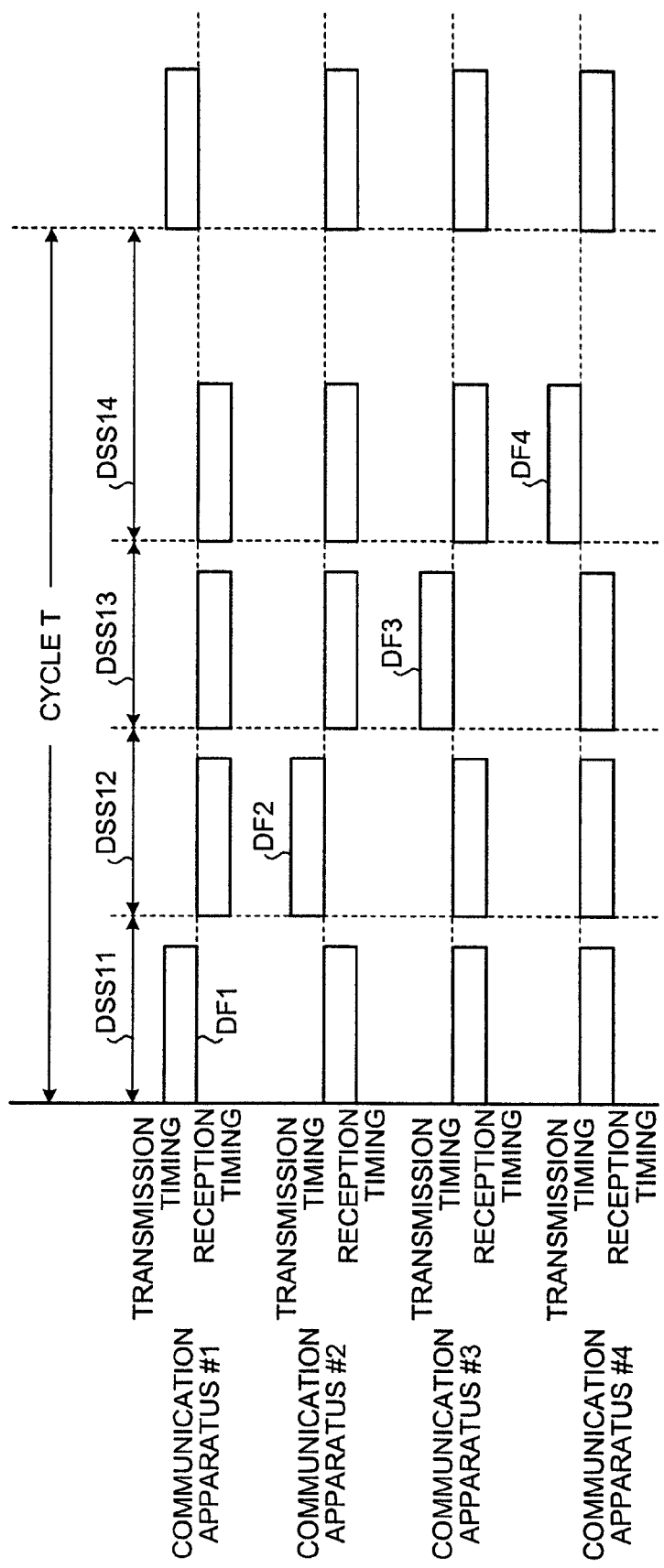
FIG. 7 is a diagram for explaining communication timings of a conventional communication system using a time division mode.
Figure 8:
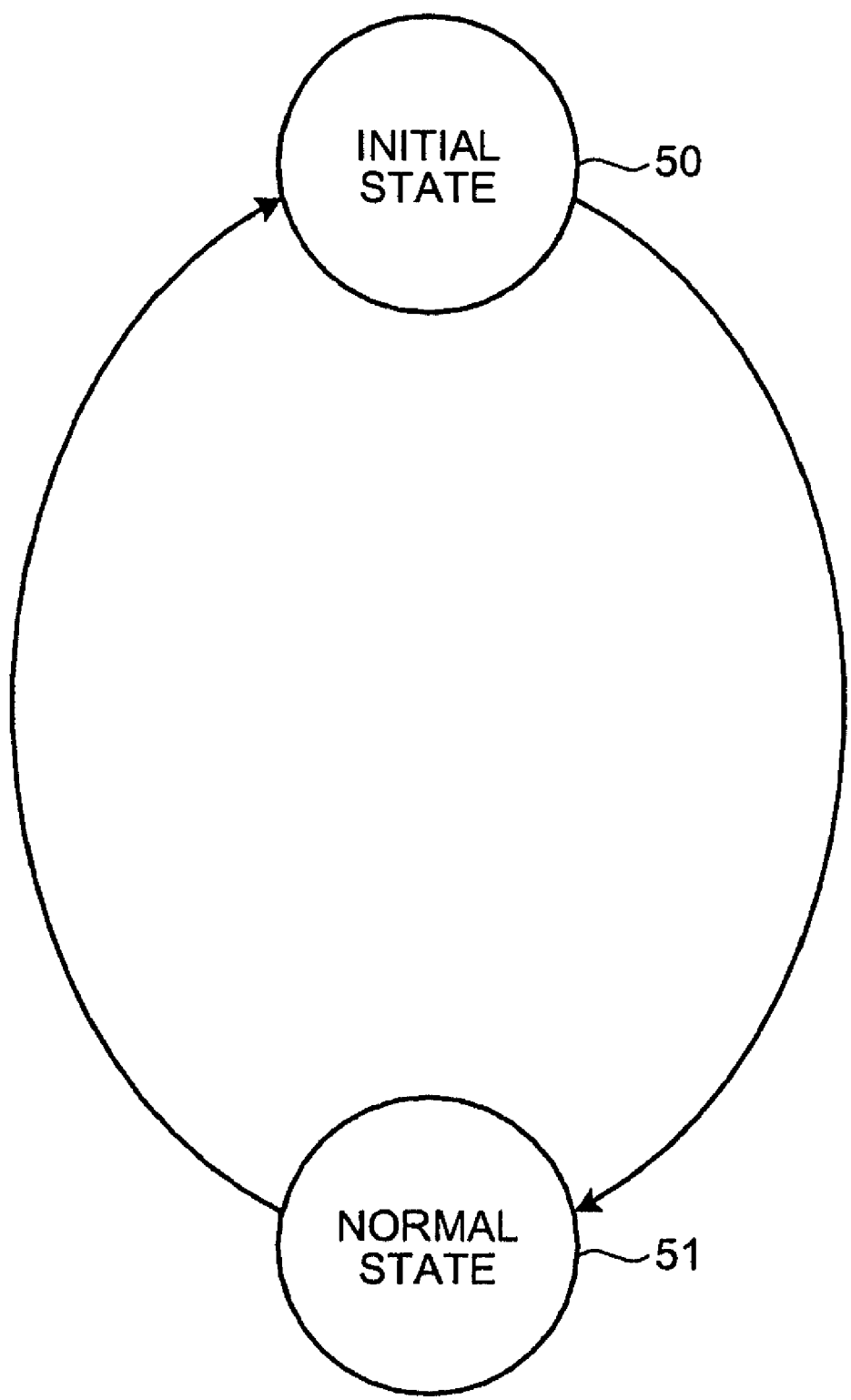
FIG. 8 is a transition diagram of a conventional communication system using a time division mode.

The division of the communication cycle of the communication system according to the present invention will be compared with that of a conventional communication system using a time division mode. FIG. 7 is a diagram of communication timings of the conventional communication system using the time division mode. In FIG. 7, the cycle T is configured by sub-slots DSS11 to DSS14 divided by the number of the communication apparatuses in the system (in this case, four); the sub-slot DSS11 is allocated to a communication apparatus #1; the sub-slot DSS12 is allocated to a communication apparatus #2; the sub-slot DSS13 is allocated to a communication apparatus #3; and the sub-slot DSS14 is allocated to a communication apparatus #4. That is, the communication timings of the conventional communication system using the time division mode are configured only by the sub-slots DSS11 to DSS14 and only the data communication is performed in the cycle T. Therefore, in the normal state when performing the data communication, the setting cannot be performed for the setting values related to communication, such as timings of transmission/reception and synchronization setting of the communication apparatuses #1 to #4. Therefore, as shown in a state transition diagram of FIG. 8, the conventional communication system using the time division mode transits to a normal state 51 to perform the data communication after the setting of various setting values related to the communication is set in an initial state 50 when the data communication is not performed. If various setting values related to the communication are updated, the conventional communication system transits from the normal state 51 to the initial state 50 to update the setting and then transits to the normal state 51 to resume the data communication.

Figure 9:
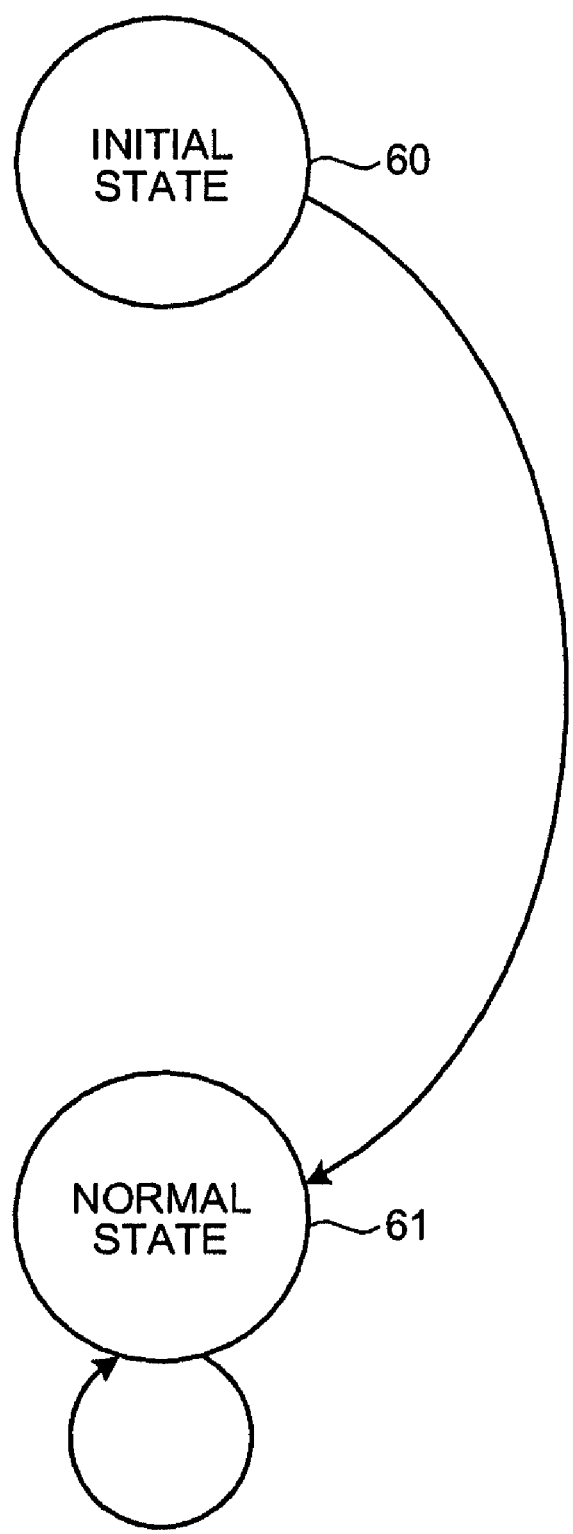
FIG. 9 is a transition diagram of the communication system of the first embodiment according to the present invention.

On the other hand, in the case of the communication system of the first embodiment according to the present invention, the cycle T is configured by a plurality of the data communication sub-slots DSS used in the data communication and the maintenance communication sub-slot MSS used in the maintenance communication for setting/monitoring various setting values related to the communication as shown in FIG. 2, and therefore, the communication system sets various setting values related to the communication in an initial state 60 at the start-up of the system and transits to a normal state 61 to start the data communication as shown in FIG. 9. Since the communication system subsequently performs the normal data communication in the data communication sub-slots DSS and performs the maintenance communication for setting/monitoring various setting values related to the communication in the maintenance communication sub-slot MSS1, the various setting values related to the communication can be set/monitored in the normal state 61 without transiting to the initial state 60. In general, a data amount of the various setting values related to the communication is significantly smaller than a data amount of the normal data communication. Therefore, the data communication can be continued if the maintenance communication sub-slot MSS1 is disposed in the cycle T and the throughput of the communication system is not reduced.

As described above, in the first embodiment, the cycle T of the time division mode is configured by the data communication sub-slots DSS allocated to the communication apparatuses 3 for the data communication and the maintenance communication sub-slot MSS1 used in the maintenance communication of the communication apparatuses 3; the master communication apparatus 3-1 uses the maintenance communication sub-slot MSS1 to change or monitor the communication setting register 36 having set thereon various setting values related to the cycle T of the time division mode, the data communication sub-slots DSS, and the maintenance communication sub-slot MSS1 of the slave communication apparatuses 3-2 to 3-4 based on the configuration register 33 having registered thereon the information about the setting/monitoring related to the maintenance communication; and therefore, various setting values related to the communication in the time division mode can be updated or monitored without discontinuing the data communication.

Since the master communication apparatus 3-1 includes the area information consisting of the beginning address and the data length in the maintenance frame MF requesting the update or monitoring of the communication setting register 36 of the slave communication apparatus 3-2 to 3-4 in the first embodiment, only the required setting values can be updated or monitored without exchanging all the setting values of the communication setting register 36, and reduction of the data amount of the data communication can be constrained even when the maintenance communication sub-slot MSS1 is disposed in the cycle T of the time division mode.

Although the operation of the slave communication apparatus is achieved by setting the maintenance communication mode register 331 in the configuration register 33 to the maintenance communication OFF mode in the first embodiment, the slave communication apparatus may not necessarily include the configuration register 33.

Second Embodiment

A second embodiment of the present invention will be described with reference to FIG. 10. Although one communication apparatus among the communication apparatuses in the communication system is defined as the master communication apparatus changing or monitoring the communication setting register 36 in the first embodiment, a plurality of the master communication apparatuses exists in the description of the second embodiment.

A communication system of the second embodiment according to the present invention is substantially the same as the communication system of the first embodiment shown in FIG. 1, except that the communication apparatuses 3-2 to 3-4 operate as the master communication apparatuses to enable the CP 1 to set the setting values in the configuration registers 33 of the communication apparatuses 3-1 to 3-4 in the second embodiment while the communication apparatuses 3-2 to 3-4 operate as the slave communication apparatuses in the first embodiment. The configuration of the communication apparatuses 3 is the same as that of the communication apparatuses 3 shown in FIG. 3 and will not be described.

Figure 10:
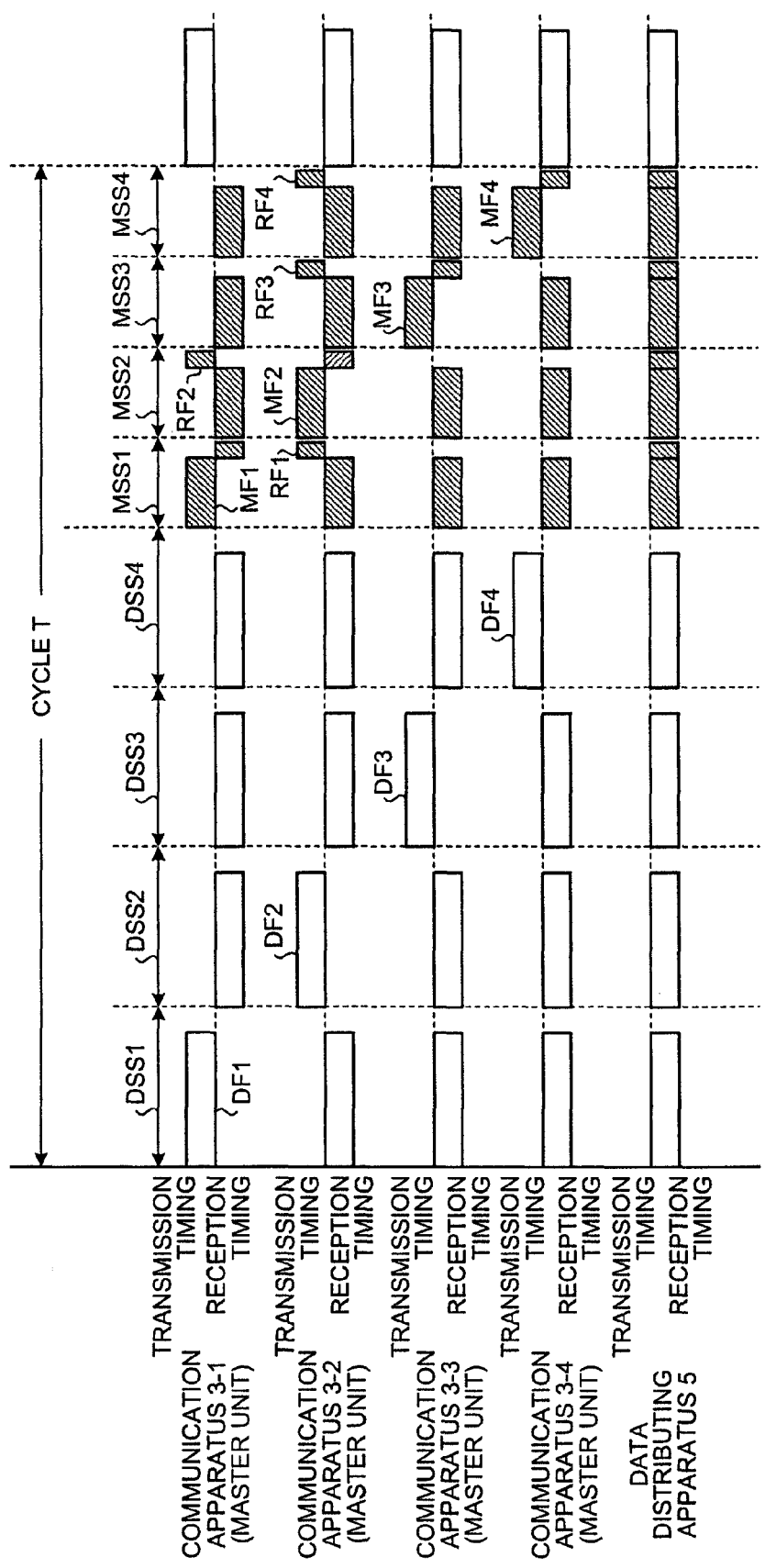
FIG. 10 is a diagram for explaining communication timings of a communication system of a second embodiment.

FIG. 10 is a diagram of communication timings of the communication system of the second embodiment according to the present invention. In FIG. 10, the cycle T is configured by data communication sub-slots DSS (representing DSS1 to DSS4) corresponding to the number of the communication apparatuses 3 (in this case, four) in the system, which is used for the data communication, and the maintenance communication sub-slots MSS (MSS1 to MSS4) corresponding to the number of the communication apparatuses 3 operating as the master communication apparatuses (in this case, four), which is used for communication controlling the communication setting; the data communication sub-slot DSS1 and the maintenance communication sub-slot MSS1 are allocated to the communication apparatus 3-1; the data communication sub-slot DSS2 and the maintenance communication sub-slot MSS2 are allocated to the communication apparatus 3-2; the data communication sub-slot DSS3 and the maintenance communication sub-slot MSS3 are allocated to the communication apparatus 3-3; and the data communication sub-slot DSS4 and the maintenance communication sub-slot MSS4 are allocated to the communication apparatus 3-4. Although the maintenance communication sub-slots MSS are located after the data communication sub-slots DSS, this is not a limitation and, for example, the data communication sub-slots DSS may be located after the maintenance communication sub-slots MSS or the sub-slots may be arranged in the order of the data communication sub-slot DSS1, the maintenance communication sub-slot MSS1, the data communication sub-slot DSS2, the maintenance communication sub-slot MSS2, the data communication sub-slot DSS3, the maintenance communication sub-slot MSS3, the data communication sub-slot DSS4, and the maintenance communication sub-slot MSS4.

The operation of the communication system of the second embodiment will be described. The data communication operation in the data communication sub-slots DSS is the same as the first embodiment and will not be described here and only the maintenance communication operation in the maintenance communication sub-slots MSS will be described. The same operation as the first embodiment will not be described in detail.

Figure 5:
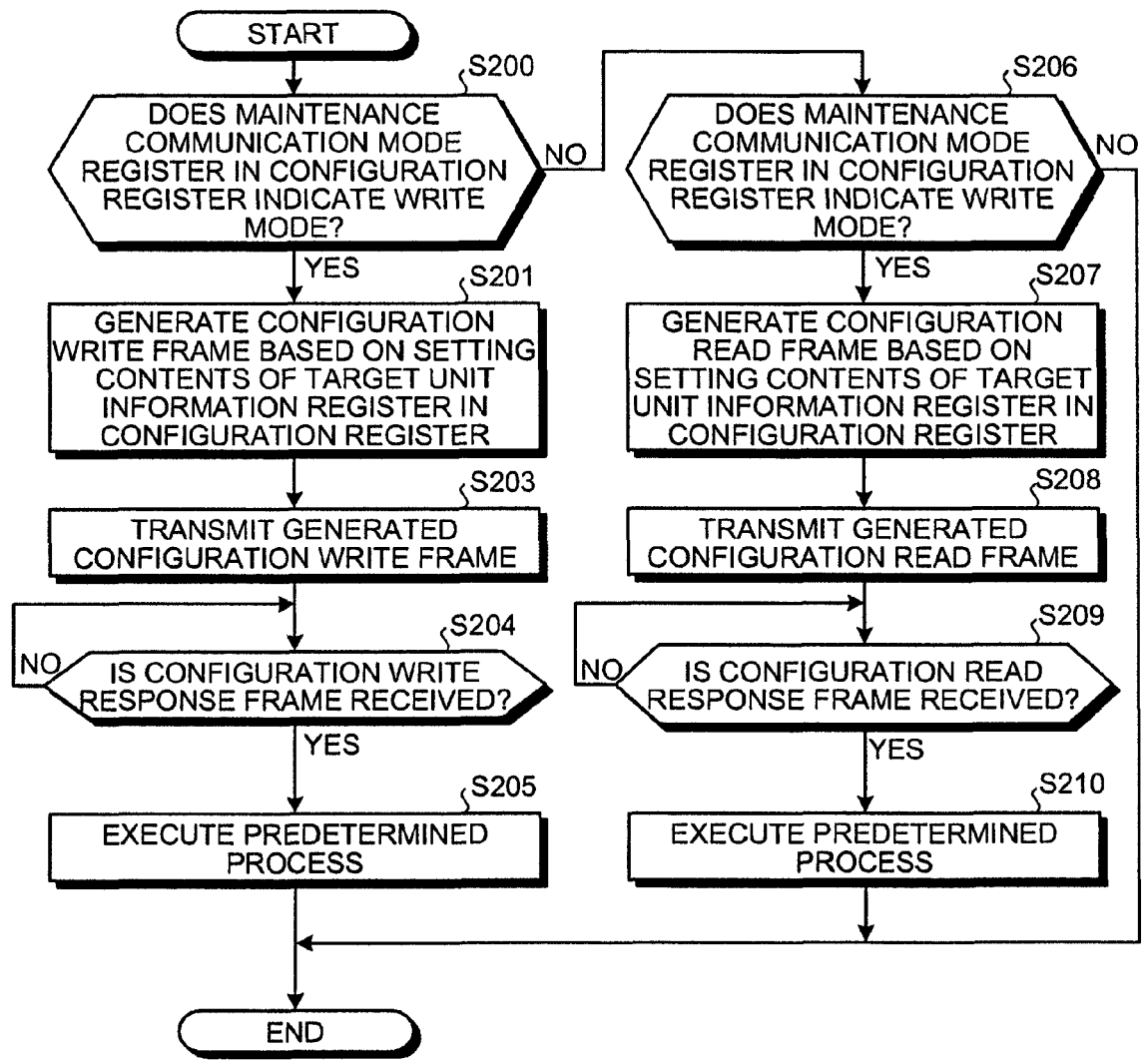
FIG. 5 is a flowchart for explaining an operation of a maintenance communication process of a communication apparatus operating as a master.

At the start time of the maintenance communication sub-slot MSS1 (the maintenance communication timing of the communication apparatus 3-1), the communication apparatus 3-1 generates a maintenance frame (configuration write frame or configuration read frame) addressed to an arbitrary communication apparatus (in this case, communication apparatus 3-2) and transmits the maintenance frame to the data distributing apparatus 5 through the maintenance communication process of the master communication apparatus described with reference to the flowchart of FIG. 5. The data distributing apparatus 5 analyzes a maintenance frame MF1 to transfer the maintenance frame MF1 to the communication apparatus 3-2 that is the transmission destination. In the maintenance communication sub-slots MSS other than the maintenance communication sub-slot MSS allocated to the own apparatus, the communication apparatus 3 is in the reception waiting state and executes the maintenance communication process of the slave communication apparatus described with reference to FIG. 6 when receiving the maintenance frame MF1. In this case, the communication apparatus 3-2 operates as the slave communication apparatus to generate and transmit a maintenance response frame RF1 (configuration write response frame or configuration read response frame) to the data distributing apparatus 5. The data distributing apparatus 5 analyzes the maintenance response frame RF1 to transfer the maintenance response frame RF1 to the destination communication apparatus (in this case, communication apparatus 3-1). The communication apparatus 3-1 receives the maintenance response frame to recognize that the maintenance communication (changing in the setting value or monitoring of the communication value related to the communication of the target communication apparatus 3-2) is completed.

At the start time of the maintenance communication sub-slot MSS2 (the maintenance communication timing of the communication apparatus 3-2), the communication apparatus 3-2 generates a maintenance frame (configuration write frame or configuration read frame) addressed to an arbitrary communication apparatus (in this case, communication apparatus 3-1) and transmits the maintenance frame to the data distributing apparatus 5 through the maintenance communication process of the master communication apparatus described with reference to the flowchart of FIG. 5. The data distributing apparatus 5 analyzes a maintenance frame MF2 to transfer the maintenance frame MF2 to the communication apparatus 3-1 that is the transmission destination. In the maintenance communication sub-slots MSS other than the maintenance communication sub-slot MSS allocated to the own apparatus, the communication apparatus 3 is in the reception waiting state and executes the maintenance communication process of the slave communication apparatus described with reference to FIG. 6 when receiving the maintenance frame MF1. In this case, the communication apparatus 3-1 operates as the slave communication apparatus to generate and transmit a maintenance response frame RF2 (configuration write response frame or configuration read response frame) to the data distributing apparatus 5. The data distributing apparatus 5 analyzes the maintenance response frame RF2 to transfer the maintenance response frame RF2 to the destination communication apparatus (in this case, communication apparatus 3-2). The communication apparatus 3-2 receives the maintenance response frame to recognize that the maintenance communication (changing in the setting value or monitoring of the communication value related to the communication of the target communication apparatus 3-1) is completed.

At the start time of the maintenance communication sub-slot MSS3 (the maintenance communication timing of the communication apparatus 3-3), the communication apparatus 3-3 generates a maintenance frame (configuration write frame or configuration read frame) addressed to an arbitrary communication apparatus (in this case, communication apparatus 3-2) and transmits the maintenance frame to the data distributing apparatus 5 through the maintenance communication process of the master communication apparatus described with reference to the flowchart of FIG. 5. The data distributing apparatus 5 analyzes a maintenance frame MF3 to transfer the maintenance frame MF3 to the communication apparatus 3-2 that is the transmission destination. In the maintenance communication sub-slots MSS other than the maintenance communication sub-slot MSS allocated to the own apparatus, the communication apparatus 3 is in the reception waiting state and executes the maintenance communication process of the slave communication apparatus described with reference to FIG. 6 when receiving the maintenance frame MF1. In this case, the communication apparatus 3-2 operates as the slave communication apparatus to generate and transmit a maintenance response frame RF3 (configuration write response frame or configuration read response frame) to the data distributing apparatus 5. The data distributing apparatus 5 analyzes the maintenance response frame RF3 to transfer the maintenance response frame RF3 to the destination communication apparatus (in this case, communication apparatus 3-3). The communication apparatus 3-3 receives the maintenance response frame to recognize that the maintenance communication (changing in the setting value or monitoring of the communication value related to the communication of the target communication apparatus 3-2) is completed.

At the start time of the maintenance communication sub-slot MSS4 (the maintenance communication timing of the communication apparatus 3-4), the communication apparatus 3-4 generates a maintenance frame (configuration write frame or configuration read frame) addressed to an arbitrary communication apparatus (in this case, communication apparatus 3-2) and transmits the maintenance frame to the data distributing apparatus 5 through the maintenance communication process of the master communication apparatus described with reference to the flowchart of FIG. 5. The data distributing apparatus 5 analyzes a maintenance frame MF4 to transfer the maintenance frame MF4 to the communication apparatus 3-2 that is the transmission destination. In the maintenance communication sub-slots MSS other than the maintenance communication sub-slot MSS allocated to the own apparatus, the communication apparatus 3 is in the reception waiting state and executes the maintenance communication process of the slave communication apparatus described with reference to FIG. 6 when receiving the maintenance frame MF1. In this case, the communication apparatus 3-2 operates as the slave communication apparatus to generate and transmit a maintenance response frame RF4 (configuration write response frame or configuration read response frame) to the data distributing apparatus 5. The data distributing apparatus 5 analyzes the maintenance response frame RF4 to transfer the maintenance response frame RF4 to the destination communication apparatus (in this case, communication apparatus 3-4). The communication apparatus 3-4 receives the maintenance response frame to recognize that the maintenance communication (changing in the setting value or monitoring of the communication value related to the communication of the target communication apparatus 3-2) is completed.

Since a plurality of the master communication apparatuses 3 changing and monitoring the communication setting registers 36 of other communication apparatuses is disposed in the second embodiment as described above, if one of the master communication apparatuses 3 crashes, another master communication apparatus 3 can change or monitor the communication setting registers 36.

Although all the communication apparatuses 3 in the communication system operate as the maser communication apparatus in the example described in the second embodiment, only two or more of the communication apparatus 3 may operate as the maser communication apparatuses and other communication apparatuses 3 may operates only as the slave communication apparatus.

Third Embodiment

Figure 11:
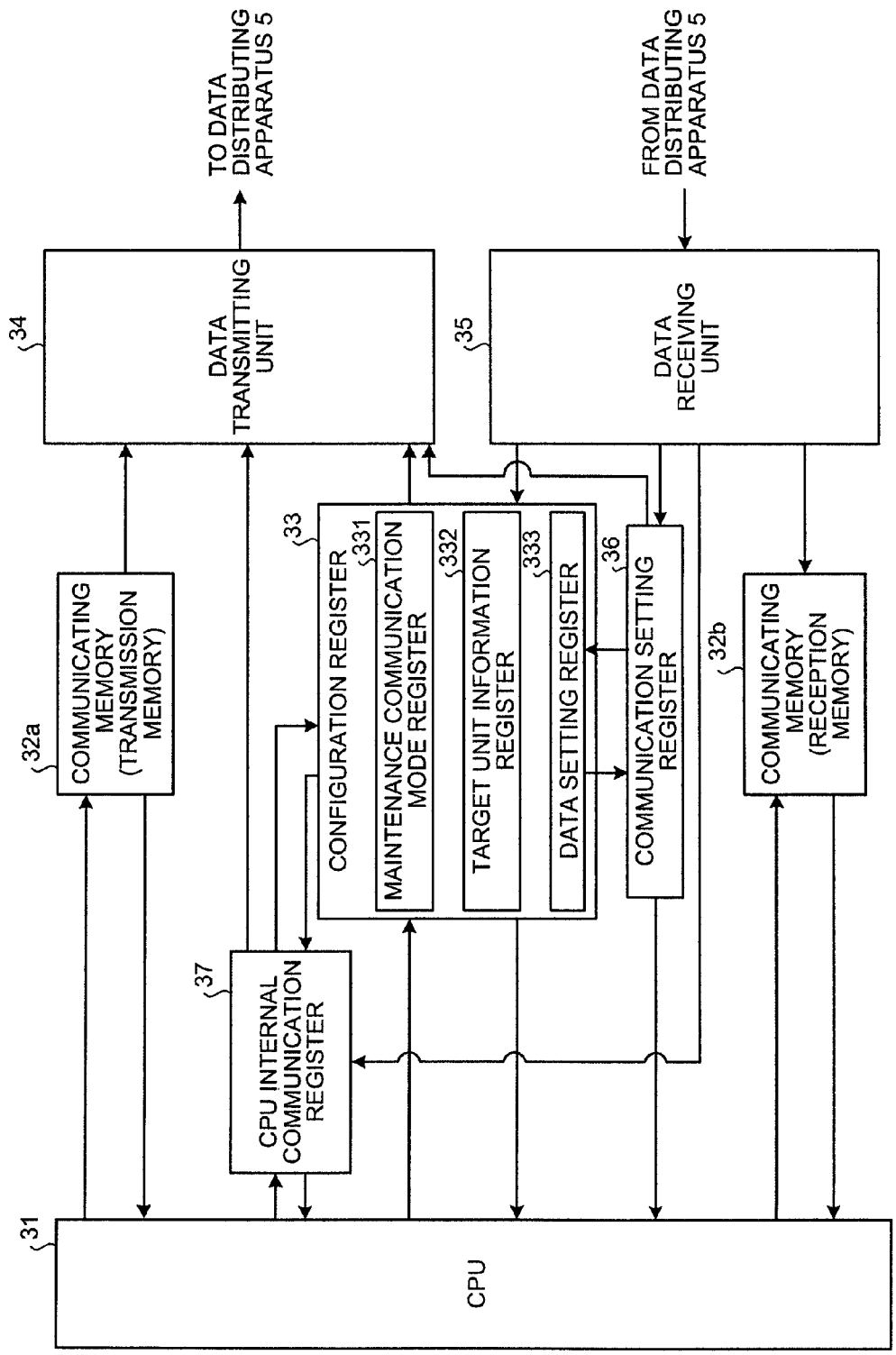
FIG. 11 is a block diagram of a configuration of a communication apparatus of a third embodiment.

A third embodiment of the present invention will be described with reference to FIG. 11. Although the setting/monitoring is performed of the information about communication in common among the communication apparatuses 3 in the maintenance communication, i.e., the setting value related to the time division communication set in the communication setting register 36 in the first and second embodiments, the updating/monitoring of information about communication specific to each of the communication apparatuses 3 (communication setting information within the unit) is performed in addition to the updating/monitoring of the setting value related to the time division communication in the communication setting register 36 in the third embodiment.

A communication system of the third embodiment according to the present invention includes communication apparatuses 3a-1 to 3a-4 instead of the communication apparatuses 3-1 to 3-4 of the first or second embodiment. FIG. 11 is a block diagram of a configuration of a communication apparatus 3a (representing 3a-1 to 3a-4). In the communication apparatus 3a shown in FIG. 11, a CPU internal communication register 37 is added to the communication apparatus of the first embodiment shown in FIG. 3. The same reference numerals are added to constituent elements having the same functions as the communication apparatus of the first embodiment shown in FIG. 3 and overlapping description will be omitted.

The communication setting information with in the unit (information of transmission/reception and communication timings within the unit) is set in the CPU internal communication register 37. The CPU 31 performs communication within the unit based on the setting values in the CPU internal communication register 37 and performs data communication in the time division mode based on the setting values in the communication setting register 36.

When updating or monitoring the CPU internal communication register 37, the PC 1 sets area information indicating a partial or entire area of the CPU internal communication register 37 in the target unit information register 332 within the configuration register 33 of the communication apparatus 3a operating as the master communication apparatus. As a result, the communication apparatus 3a operating as the master communication apparatus generates a maintenance frame (configuration write frame or configuration read frame) including the area information indicating a partial or entire area of the CPU internal communication register 37 and transmits the generated maintenance frame to the target communication apparatus 3a through the maintenance communication process of the master communication apparatus shown in FIG. 5.

If the area information included in the maintenance frame indicates a partial or entire area of the CPU internal communication register 37, the communication apparatus receiving the maintenance frame defines the CPU internal communication register 37 as an access target. Specifically, when receiving the configuration write frame including the area information indicating a partial or entire area of the CPU internal communication register 37, the various setting values included in the configuration write frame is set in the area of the CPU internal communication register 37 indicated by the area information, and when receiving the configuration read frame including the area information indicating a partial or entire area of the CPU internal communication register 37, a configuration read response frame is generated and transmitted which includes the setting values of the CPU internal communication register 37 indicated by the area information.

Since the higher-order apparatus, i.e., the PC1 sets the area information that is area information indicating a partial or entire area of the CPU internal communication register 37 in the target unit information register 332 within the configuration register 33 of the communication apparatus 3a operating as the master communication apparatus in the third embodiment as described above, the setting value related to the internal communication specific to the communication apparatuses 3 can be updated or monitored without discontinuing the data transfer.

Figure 12:
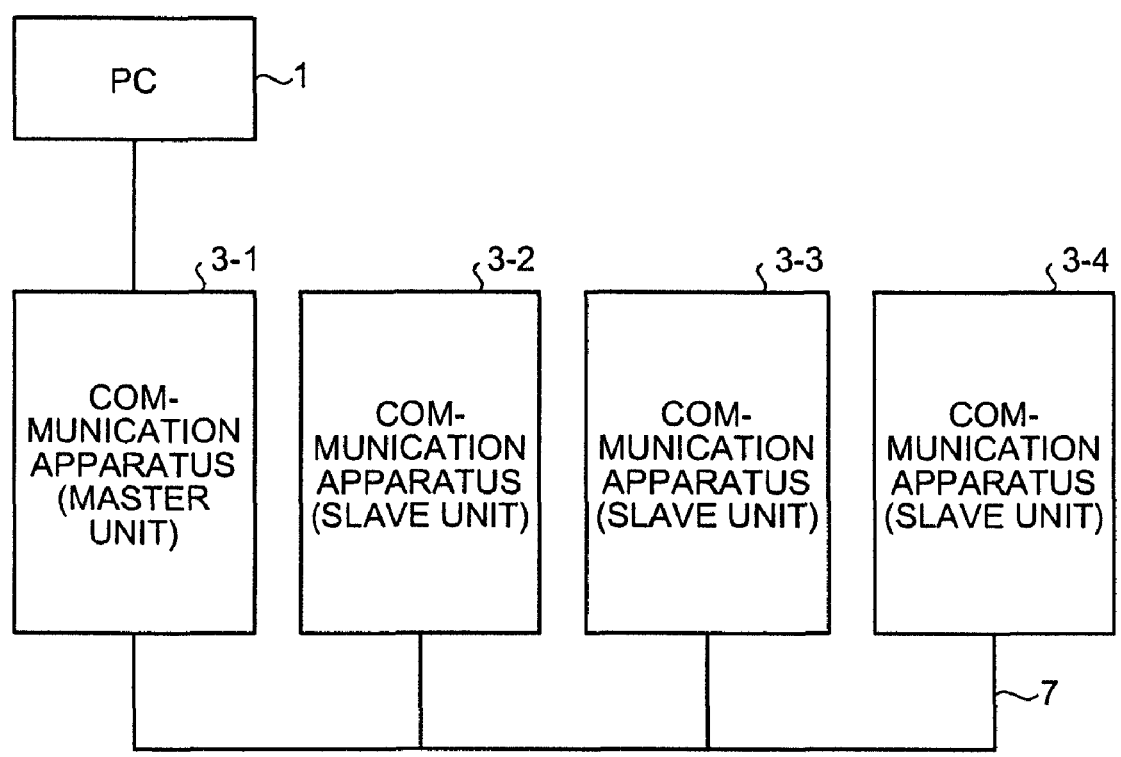
FIG. 12 is a diagram of another configuration of the communication system according to the present invention.

Although the data distributing apparatus 5 transfers the frames in the first to third embodiments, the communication apparatuses 3 may be connected through a bus 7 without using the data distributing apparatus 5 as shown in FIG. 12. In such a configuration, a data transfer speed is expected to be improved among CPUs of sequencers, motion controllers, robot controllers, etc., including the communication apparatuses 3 or the communication apparatuses 3a by using the present invention.

INDUSTRIAL APPLICABILITY

A communication system of the present invention is useful for a communication system using a time division mode as above and is particularly suitable for a communication system using FA (Factory Automation).

The invention claimed is:

1. A communication system comprising a plurality of communication apparatuses that communicate with each other during a cycle in a time division mode, wherein the cycle includes:
   a plurality of data communication sub-slots respectively allocated to the plurality of the communication apparatuses for data communication; and
   a maintenance communication sub-slot used for maintenance communication of the plurality of the communication apparatuses,
   wherein each of the plurality of the communication apparatuses comprises:
   a communication setting register having set thereon setting values related to the cycle in the time division mode, a data communication sub-slot allocated to the respective communication apparatus, and the maintenance communication sub-slot; and
   a communication controlling unit that controls communication in the time division mode based on the setting values set in the communication setting register to transmit a first data frame including data to be transmitted in the data communication sub-slot allocated to the respective communication apparatus, the communication controlling unit using data included in a second data frame received in a data communication sub-slot allocated to another communication apparatus to control the respective communication apparatus, wherein one of the communication apparatuses operates as a master communication apparatus and communication apparatuses other than the master communication apparatus operate as slave communication apparatuses, the master communication apparatus further comprising:

a configuration register having registered thereon setting/monitoring information related to the maintenance communication, wherein the communication control unit of the master communication apparatus transmits, in the maintenance communication sub-slot, a maintenance frame to change or monitor the setting values set in communication setting registers of other communication apparatuses based on the setting/monitoring information registered in the configuration register, wherein a communication control unit of at least one of the slave communication apparatuses transmits to the master communication apparatus or sets, in the maintenance communication sub-slot, at least some setting values of the communication register in response to a received maintenance frame addressed to the slave communication apparatus.

2. The communication system according to claim 1, wherein the configuration register includes an operation mode register having set thereon an operation mode of the maintenance communication, a target unit information register having set thereon information of a target communication apparatus of the maintenance communication, and a data setting register that stores setting values to be updated or monitored, wherein the communication controlling unit of the communication apparatus operating as the master communication apparatus generates a configuration write frame including setting values set in the data setting register to transmit the generated configuration write frame to the target communication apparatus set in the target unit information register within the maintenance communication sub-slot if the operation mode set in the operation mode register indicates a write mode, or the communication controlling unit generates a configuration read frame to transmit the generated configuration read frame to the target communication apparatus set in the target unit information register if the operation mode set in the operation mode register indicates a read mode, wherein the target communication apparatus sets in response to receiving the configuration write frame, setting values included in the configuration write frame in a communication setting register of the target communication apparatus, or generates, in response to receiving the configuration read frame, a configuration read response frame including at least some setting values set in the communication setting register of the target communication apparatus and transmits the generated configuration read response frame to the master communication apparatus, and wherein the master communication apparatus, in response to receiving the configuration read response frame, updates the setting values stored in the data setting register based on the setting values included in the configuration read response frame.

3. The communication system according to claim 2, wherein the information set in the target unit information register for the target communication apparatus of the maintenance communication comprises a communication apparatus identifier for identifying the target communication apparatus of the maintenance communication and area information comprising a beginning address and a data length of an area of the communication setting register of the target communication apparatus, which area is a target of the maintenance communication, wherein the communication controlling unit of the master communication apparatus generates the configuration write frame to include setting values set in the data setting register, the communication apparatus identifier, and the area information, and wherein the communication controlling unit of the target communication apparatus sets, in response to receiving the configuration write frame, setting values of the communication setting register of the target communication apparatus using the area information and the setting values included in the configuration write frame, and in response to receiving a configuration read frame including the area information, the communication control unit of the target control apparatus sets setting values in the configuration read response frame, from among setting values set in the communication setting register of the target communication apparatus, using the area information included in the configuration read frame.

4. The communication system according to claim 3, wherein each of the plurality of the communication apparatus further comprises:

an internal communication register having set thereon setting values controlling communication specific to the respective communication apparatus, and wherein if the area information included in the configuration read frame indicates a partial or entire area of the internal communication register, the communication controlling unit of the respective communication apparatus operating as the slave communication apparatus includes various setting values set in the partial or entire area of the internal communication register indicated by the area information in the configuration read response frame.

5. The communication system according to claim 3, wherein each of the plurality of the communication apparatus further comprises:

an internal communication register having set thereon setting values controlling communication specific to the respective communication apparatus, wherein if the area information included in the configuration write frame indicates a partial or entire area of the internal communication register, the communication controlling unit of the respective communication apparatus operating as the slave communication apparatus sets the setting values included in the configuration write frame in the partial or entire area of the internal communication register indicated by the area information.

6. A communication apparatus included in a communication system comprising a plurality of communication apparatuses that communicate with each other during a cycle in a time division mode, wherein the cycle includes:

a plurality of data communication sub-slots respectively allocated to the plurality of the communication apparatuses for data communication; and a maintenance communication sub-slot used for maintenance communication of the plurality of the communication apparatuses, wherein the communication apparatus comprises:

a communication setting register having set thereon setting values related to the cycle in the time division mode, a data communication sub-slot, among the plurality of data communication sub-slots, allocated to the communication apparatus, and the maintenance communication sub-slot;

a configuration register having registered thereon setting/monitoring information related to the maintenance communication; and a communication controlling unit that controls communication in the time division mode based on the setting values set in the communication setting register to transmit a first data frame including data to be transmitted in the data communication sub-slot allocated to the communication apparatus, the communication controlling unit using data included in a second data frame received in a data communication sub-slot allocated to another communication apparatus to control the communication apparatus, wherein when the communication apparatus operates as a master communication apparatus, the communication controlling unit, in the maintenance communication sub-slot, transmits a maintenance frame to change or monitor the setting values set in communication setting registers of other communication apparatuses based on the setting/monitoring information registered in the configuration register, wherein when the communication apparatus operates as a slave communication apparatus, the communication controlling unit transmits to a master communication apparatus or sets, in the maintenance communication sub-slot, at least some setting values of the communication setting register based on a received maintenance frame addressed to the slave communication apparatus.

7. The communication apparatus according to claim 6, wherein the configuration register includes:

an operation mode register having set thereon an operation mode of the maintenance communication;

a target unit information register having set thereon information of a target communication apparatus of the maintenance communication; and a data setting register that stores setting values to be updated or monitored, wherein the communication controlling unit generates, when the communication apparatus operates as the master communication apparatus and if the operation mode set in the operation mode register indicates a write mode, a configuration write frame including the setting values set in the data setting register to transmit the generated configuration write frame to the target communication apparatus set in the target unit information register within the maintenance communication sub-slot and, the communication controlling unit generates, if the operation mode set in the operation mode register indicates a read mode, a configuration read frame to transmit the generated configuration read frame to the target communication apparatus set in the target unit information register, wherein the communication controlling unit sets, when the communication apparatus operates as the slave communication apparatus, setting values included in a received configuration write frame in the communication setting register of the slave communication apparatus in response to receiving the configuration write frame, and generates a configuration read response frame including setting values set in the communication setting register of the slave communication apparatus and transmits the generated configuration read response frame to the communication apparatus operating as the master communication apparatus that transmitted the configuration read frame in the case of response to receiving the configuration read frame.

8. The communication apparatus according to claim 7, wherein the information set in the target unit information register for the target communication apparatus of the maintenance communication comprises a communication apparatus identifier for identifying the target communication apparatus of the maintenance communication and area information comprising a beginning address and a data length of an area of a communication setting register of the target communication apparatus, which area is a target of the maintenance communication, wherein when operating as the master communication apparatus, the communication controlling unit includes, in the configuration write frame, setting values in an area of the data setting register which area begins at a top of the data setting register and has a length of the data length of the area information and includes, in a the configuration read frame, the area information set in the target unit information register, and wherein when operating as the slave communication apparatus, the communication controlling unit sets the setting values included in the configuration write frame in the area indicated by the area information included in the configuration write frame within the area of the communication setting register of the communication apparatus in response to receiving the configuration write frame, and includes, in the configuration read response frame, setting values set in the area indicated by the area information included in the configuration read frame among setting values set in the communication setting register of the communication apparatus in the case of response to receiving the configuration read frame.

9. The communication apparatus according to claim 8, further comprising an internal communication register having set thereon various setting values controlling communication specific to the communication apparatus, wherein when the communication apparatus is operating as the slave communication apparatus and if the area information included in a received configuration read frame indicates a part or the entirety of the internal communication register, then the communication controlling unit includes setting values set in the partial or entire area of the internal communication register indicated by the area information in the configuration read response frame.

10. The communication apparatus according to claim 8, further comprising an internal communication register having set thereon setting values controlling communication specific to the communication apparatus, wherein when the communication apparatus is operating as the slave communication apparatus and if the area information included in a received configuration write frame indicates a part or the entirety of the internal communication register, then the communication controlling unit sets the setting values included in the configuration write frame in the partial or entire area of the internal communication register indicated by the area information.

* * * * *